US008893755B2

United States Patent
Morita

(10) Patent No.: US 8,893,755 B2
(45) Date of Patent: Nov. 25, 2014

(54) PNEUMATIC TIRE

(75) Inventor: Kenichi Morita, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 601 days.

(21) Appl. No.: 13/096,928

(22) Filed: Apr. 28, 2011

(65) Prior Publication Data

US 2011/0265925 A1 Nov. 3, 2011

(30) Foreign Application Priority Data

Apr. 30, 2010 (JP) ................................. 2010-105261

(51) Int. Cl.
*B60C 11/01* (2006.01)
*B60C 11/00* (2006.01)

(52) U.S. Cl.
CPC ......... *B60C 11/0058* (2013.04); *B60C 11/0083* (2013.04); *B60C 2011/0025* (2013.04)
USPC .................... 152/209.14; 152/209.5; 152/454

(58) Field of Classification Search
CPC ............ B60C 11/0058; B60C 11/0083; B60C 11/0041; B60C 11/005; B60C 11/0066; B60C 11/0075; B60C 11/01; B60C 11/0032; B60C 2011/0005; B60C 2011/0016; B60C 2011/0025; B60C 2011/0033
USPC .............. 152/209.1, 209.4, 209.16, 450, 454, 152/209.14, 209.5
See application file for complete search history.

(56) References Cited

U.S. PATENT DOCUMENTS

| | | | | |
|---|---|---|---|---|
| 5,803,998 A | * | 9/1998 | Ohsawa et al. | .......... 152/209.16 |
| 8,272,414 B2 | * | 9/2012 | Matsunaga et al. | ...... 152/209.14 |
| 2008/0105347 A1 | | 5/2008 | Matsunaga et al. | |

FOREIGN PATENT DOCUMENTS

| | | |
|---|---|---|
| JP | H04-237608 | 8/1992 |
| JP | 2000-198319 | 7/2000 |
| JP | 2003-326916 | 11/2003 |
| JP | 2006-182125 | 7/2006 |
| JP | 2007-137309 | 6/2007 |
| JP | 4076569 | 2/2008 |
| JP | 4420098 | 12/2009 |
| WO | WO 2006/134776 | 12/2006 |
| WO | WO 2008/056508 | * 5/2008 |

OTHER PUBLICATIONS

Japanese Office Action dated Dec. 18, 2013, 4 pages, Japan.
Decision on Grant Patent for Invention for Russian Application Serial No. 2011117452 dated Sep. 30, 2014, 10 pages, Russia.

* cited by examiner

*Primary Examiner* — Eric Hug
(74) *Attorney, Agent, or Firm* — Thorpe North & Western LLP

(57) ABSTRACT

A pneumatic tire in which K1, as derived from a contour range L1 and a developed tread width TDW by formula (1) below, satisfies $0.6 \leq K1 \leq 0.9$, and K2, as derived from a curvature radius TR1 of the center portion arc and a external tire diameter OD by formula (2) below, satisfies $2.0 < K2$.

$$K1 = L1/(TDW \times 0.5) \quad (1)$$

$$K2 = TR1/OD \quad (2).$$

18 Claims, 4 Drawing Sheets

PNEUMATIC TIRE

PRIORITY CLAIM

Priority is claimed to Japan Patent Application Serial No. 2010-105261 filed on Apr. 30, 2010.

BACKGROUND

1. Technical Field

The present technology relates to a pneumatic tire, and particularly relates to a pneumatic tire having a tread surface with a cross-sectional configuration that is formed by a plurality of arcs.

2. Related Art

In recent years, advances in reducing the weight of vehicles have been made, and, in the future, problems with vehicle deviation when braking and driving are expected. Vehicle deviation includes phenomena such as lateral drift of the vehicle when braking in order to stop a vehicle that is traveling, and lateral drift of the vehicle when accelerating in order to start a vehicle that is stopped.

For example, in a front engine/front drive type (FF-type) vehicle, a load on the rear wheels is greatly reduced when braking. However, if the center of gravity of the vehicle does not line up with the center of the vehicle, there is a possibility that a moment will be generated in the vehicle and vehicle deviation will occur. In the case of compact vehicles, vehicle deviation is seen prominently when the load on some of the tires is less than or equal to 1 kN.

It is known that the steering stability of a vehicle can be enhanced by sufficiently generating cornering power in such cases as when the load on a part of the tires is greatly reduced. For example, in Japanese Patent No. 4076569 and Japanese Patent No. 4420098, pneumatic tires are described that increase cornering power and particularly enhance steering stability when under light-load conditions by increasing the contact area when under light-load conditions through providing a profile of a tread surface with a flattened form.

With the technology described in Japanese Patent No. 4076569 and Japanese Patent No. 4420098, the performance factor that is enhanced when a tire is under light-load conditions is the steering stability. Moreover, a load on a tire that is considered as a light-load is a load of about 2 kN. Thus, means for generating cornering power under even lighter load conditions (when the load on the tire is 1 kN or less) are not considered. Today, vehicles are getting smaller, and there is a demand for a means for generating sufficient cornering power when under light-load conditions of 1 kN or less.

In light of the foregoing, an object of the present technology is to provide a pneumatic tire that can sufficiently generate cornering power when under light-load conditions and suppress vehicle deviation.

SUMMARY

In order to solve the problem described above and achieve the object, the pneumatic tire according to the present technology includes a tread surface formed, when viewed as a meridian cross-section, having a profile with a plurality of differing curvature radii. In a state where the pneumatic tire is assembled on a regular rim and is inflated to an inner pressure that is 5% of a regular inner pressure, when a curvature radius of a center portion arc located on a centermost side in the tire width direction of the tread surface is defined as TR1, a contour range that is a width from an equatorial plane to an end of the center portion arc in the tire width direction is defined as L1, a tread developed width that is a width of the tread surface in the tire width direction is defined as TDW, and an external tire diameter that is a diameter of a portion of the tread surface in a tire radial direction having a largest diameter is defined as OD, K1, as derived from the contour range L1 and the developed tread width TDW in formula (1) below, satisfies $0.6 \leq K1 \leq 0.9$, and K2, as derived from the curvature radius TR1 of the center portion arc and the external tire diameter OD in formula (2) below, satisfies $2.0 < K2$.

$$K1 = L1/(TDW \times 0.5) \tag{1}$$

$$K2 = TR1/OD \tag{2}$$

In the present technology, by setting K1, as derived from the contour range L1 and the developed tread width TDW in formula (1), to satisfy $0.6 \leq K1 \leq 0.9$, and by setting K2, as derived from the curvature radius TR1 of the center portion arc and the external tire diameter OD in formula (2), to satisfy $2.0 < K2$, the profile of the tread surface can be provided with a flattened shape. Thereby, for example, the contact area of the rear wheels of an FF-type vehicle when under light-load conditions can be increased. Therefore, cornering power under light-load conditions can be enhanced. Therefore, when braking or driving, lateral force variation, which acts on a vehicle especially when under light-load conditions, can be enhanced and, therefore, vehicle deviation can be suppressed.

As a preferred aspect of the present technology, a pneumatic tire can be configured wherein a tread portion is formed from tread portion rubber including a cap tread forming the tread surface and an under tread located inward of the cap tread in the tire radial direction; wherein the cap tread is formed from an inner side cap tread located on an inner side in the tire width direction and an outer side cap tread that is continuous with the inner side cap tread and is located on an outer side in the tire width direction. When a width from the equatorial plane to an end of the inner side cap tread in the tire width direction is defined as LC, KC, as derived from the width LC and the developed tread width TDW in formula (3) below, satisfies $0.9K1 \leq KC \leq 1.1K1$. Also, a JIS A hardness of the inner side cap tread at room temperature is 63 or greater but 75 or less, and a JIS A hardness of the outer side cap tread at room temperature is 3 or greater but 15 or less lower than the JIS A hardness of the inner side cap tread at room temperature.

$$KC = LC/(TDW \times 0.5) \tag{3}$$

In this aspect, the hardness of the cap tread is made to vary in the tire width direction. Specifically, the hardness of the inner side cap tread that is a portion that is close to the tire equatorial plane and that contacts the ground when under light-load conditions is configured so as to be greater than the hardness of the outer side cap tread that is a portion that is close to the tire shoulder end and that contacts the ground when under heavy-load conditions. Thus, by configuring the stiffness of the inner side cap tread that contacts the ground when under light-load conditions so as to be greater than the outer side cap tread, cornering power when under light-load conditions can be more reliably increased, and vehicle deviation when under light-load conditions can be greatly suppressed.

Specifically, the JIS A hardness of the inner side cap tread at room temperature can be configured so as to be 63 or greater but 75 or less. By configuring the hardness so as to be 63 or greater but 75 or less, the stiffness of the inner side cap tread can be sufficiently ensured, and vehicle deviation when under light-load conditions can be prominently suppressed. On the other hand, if the JIS A hardness exceeds 75, durability of the inner side cap tread will decrease. Additionally, the JIS A hardness of the outer side cap tread at room temperature can be configured so as to be 3 or greater but 15 or less lower than the JIS A hardness of the inner side cap tread at room temperature. By configuring a hardness difference of the hardnesses to be 3 or greater but 15 or less, the contact area of the outer side cap tread can be sufficiently ensured when under light-load conditions. On the other hand, the hardness difference will be great if it exceeds 15, and will be a cause of uneven wear.

Note that the inner side and outer side cap treads that have such a hardness difference can be used in a range that satisfies $0.9K1 \leq KC \leq 1.1K1$. In this range, cornering power can be sufficiently generated when under light-load conditions.

As another preferable aspect of the present technology, a pneumatic tire can be configured wherein the tread portion is formed from tread portion rubber including a cap tread forming the tread surface and an under tread located inward of the cap tread in the tire radial direction. The under tread is formed from an inner side under tread located on an inner side in the tire width direction and an outer side under tread that is continuous with the inner side under tread and is located on an outer side in the tire width direction. When a width from the equatorial plane to an end of the inner side under tread in the tire width direction is defined as LB, KB, as derived from the width LB and the developed tread width TDW in formula (4) below, satisfies $0.9K1 \leq KB \leq 1.1K1$. A JIS A hardness of the inner side under tread at room temperature is 55 or greater but 65 or less, and a JIS A hardness of the outer side under tread at room temperature is 3 or greater but 15 or less lower than the JIS A hardness of the inner side under tread at room temperature.

$$KB = LB/(TDW \times 0.5) \quad (4)$$

In this aspect, the hardness of the under tread is made to vary in the tire width direction. Specifically, the hardness of the inner side under tread that is located inward in roughly the tire radial direction of inner side cap tread that is a portion that is close to the tire equatorial plane and that contacts the ground when under light-load conditions is configured so as to be greater than the hardness of the outer side under tread that is located inward in roughly the tire radial direction of the outer side cap tread that is a portion that is close to the tire shoulder end and that contacts the ground when under heavy-load conditions. Thus, by configuring the stiffness of a portion on the inner side in the tire width direction of the tread portion that contacts the ground when under light-load conditions so as to be greater than a portion on the outer side in the tire width direction of the tread portion, cornering power when under light-load conditions can be more reliably increased, and vehicle deviation when under light-load conditions can be greatly suppressed.

Specifically, the JIS A hardness of the inner side under tread at room temperature can be configured so as to be 55 or greater but 65 or less. By configuring the hardness so as to be 55 or greater but 65 or less, the stiffness of the portion on the inner side in the tire width direction of the tread portion can be sufficiently ensured, and vehicle deviation when under light-load conditions can be prominently suppressed. On the other hand, if the hardness exceeds 65, durability under the tread grooves will decrease. Additionally, the JIS A hardness of the outer side under tread at room temperature can be configured so as to be 3 or greater but 15 or less lower than the JIS A hardness of the inner side under tread at room temperature. By configuring the hardness difference so as to be 3 or greater but 15 or less the stiffness of the portion on the inner side in the tire width direction of the tread portion when under light-load conditions can be sufficiently ensured, and vehicle deviation when under light-load conditions can be greatly suppressed. On the other hand, the hardness difference will be great if it exceeds 15, and thus will be a cause of uneven wear.

Additionally, the inner side and outer side under treads that have a hardness difference in a range that satisfies $0.9K1 \leq KB \leq 1.1K1$ can be used. In this range, cornering power can be sufficiently generated when under light-load conditions.

With a pneumatic tire according to the present technology, cornering power can be sufficiently generated when under light-load conditions and vehicle deviation can be suppressed.

DETAILED DESCRIPTION

The present technology is explained in detail below with reference to the drawings. However, the present technology is not limited by this explanation. Furthermore, the constituents described below include those constituents that could be easily conceived by a person skilled in the art, and constituents that are essentially identical, or, in other words, that have an equivalent scope. Additionally, the configurations described below can be combined as desired.

In the following description, "tire width direction" refers to a direction that is parallel with a rotational axis of a pneumatic tire, "inward in the tire width direction" refers to a direction facing a tire equatorial plane in the tire width direction, and "outward in the tire width direction" refers to a direction away from the tire equatorial plane in the tire width direction. Furthermore, "tire radial direction" refers to a direction orthogonal to the rotational axis, and "tire circumferential direction" refers to a direction of rotation with the rotational axis as the axis at the center of rotation.

Figure 1:
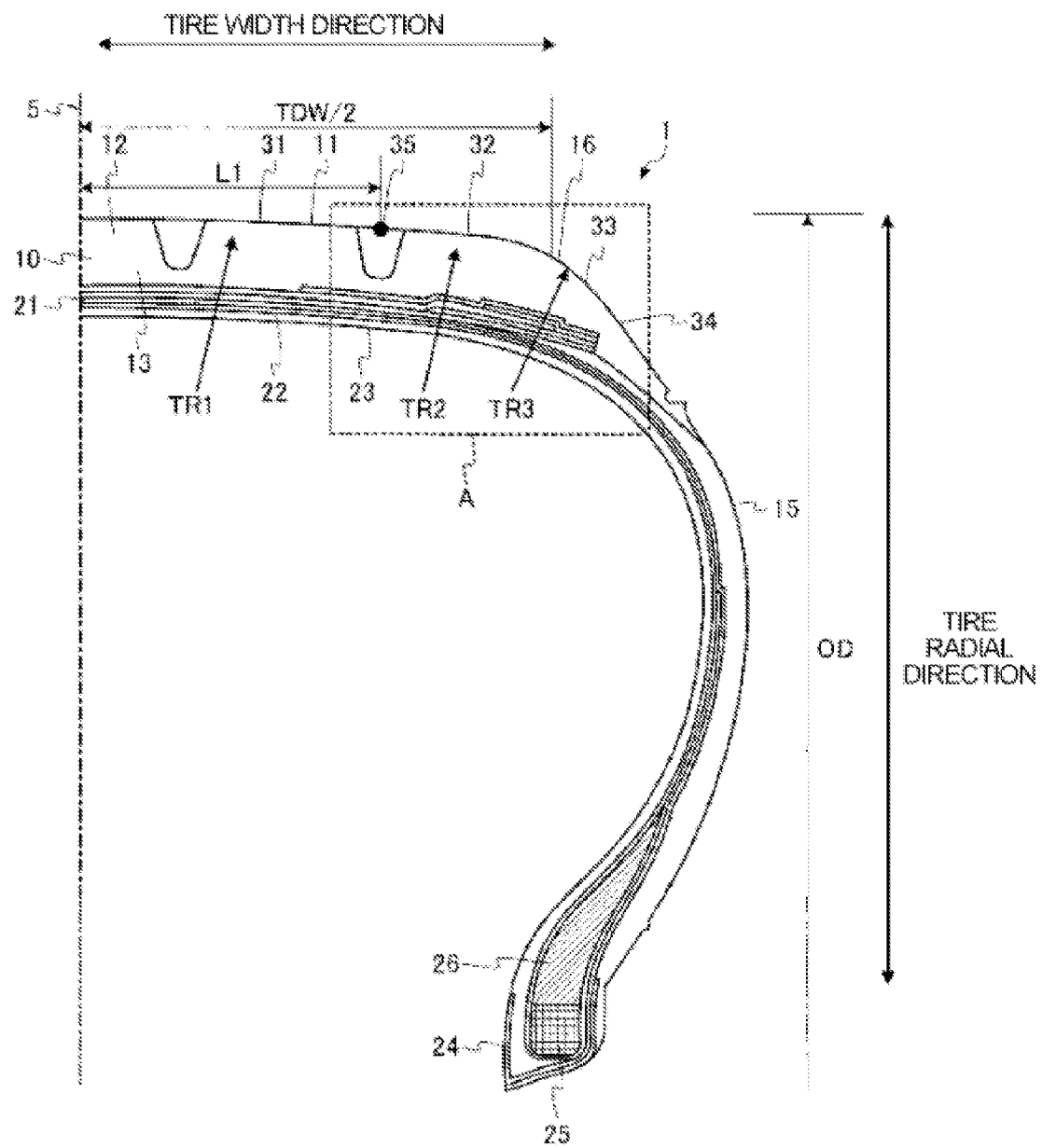
FIG. 1 is a meridian cross-sectional view illustrating main constituents of a pneumatic tire according to the embodiment.

FIG. 1 is a meridian cross-sectional view illustrating main constituents of a pneumatic tire according to the embodiment. A pneumatic tire 1 illustrated in the same drawing, when viewed as a meridian cross-section, is provided with a tread portion 10 in a portion that is an outermost side in the tire radial direction. Additionally, a side wall portion 15 is provided from an end in the tire width direction of the tread portion 10, or, in other words, from a vicinity of a shoulder 16 to a predetermined location on an inward side in the tire radial direction. In other words, the side wall portion 15 is provided at both ends in the tire width direction of the pneumatic tire 1. Furthermore, a bead portion 24 is provided inward of the side wall portion 15 in the tire radial direction. The bead portion 24 is provided at two locations of the pneumatic tire 1, and, centered on an equatorial plane 5, is provided on opposite sides of the equatorial plane 5 so as to be symmetrical. The bead portion 24 is provided with a bead core 25, and a bead filler 26 is provided outward of the bead core 25 in the tire radial direction.

A plurality of belt layers 21 is provided inward of the tread portion 10 in the tire radial direction. A carcass 22 is continuously provided inward of the belt layers 21 in the tire radial direction and on the equatorial plane 5 side of the side wall portion 15. The carcass 22 is folded outward in the tire width direction along the bead core 25 at the bead portion 24. Additionally, an inner liner 23 is formed along the carcass 22 on an inner side of the carcass 22 in the pneumatic tire 1.

The tread portion 10 has a cap tread 12 and an under tread 13 that is located thereunder in the tire radial direction. The cap tread 12 is located outward of the tread portion 10 in the tire radial direction and is exposed to the outside of the pneumatic tire 1. Thus, the portion of the cap tread 12 exposed to the outside, or, in other words, a surface of the cap tread 12, is formed as a tread surface 11. In contrast, the under tread 13 is located inward of the tread portion 10 in the tire radial direction and is provided outward of the belt layers 21 in the tire radial direction.

Regarding the tread portion 10, from a meridian cross-section view of the pneumatic tire 1, the surface of the cap tread 12, or, in other words, the tread surface 11 (the surface of the tread portion 10) is formed by a plurality of arcs having differing curvature radii. Specifically, in a state where the pneumatic tire 1 is assembled on a regular rim and is inflated to an inner pressure that is 5% of a regular inner pressure, the tread surface 11 is formed by a center portion arc 31, a shoulder side arc 32, and a shoulder portion arc 33. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). Additionally, "regular inner pressure" refers to "maximum air pressure" defined by JATMA, the maximum value in "tire load limits at various cold inflation pressures" defined by TRA, or "inflation pressures" defined by ETRTO. However, in the case of using the pneumatic tire 1 for a passenger car, the regular inner pressure is 180 kPa.

Of the plurality of arcs 31 to 33 that forms the tread surface 11, the center portion arc 31 is located in a center of the tread surface 11 in the tire width direction, includes the equatorial plane 5, and is formed on both sides of the equatorial plane 5 in the tire width direction, centered on the equatorial plane 5. A form thereof protrudes outward in the tire radial direction, and the center portion arc 31 has a largest diameter in the vicinity of the equatorial plane 5 in the tire radial direction.

The shoulder side arc 32 is located on a vehicle outer side of the center portion arc 31 in the tire width direction, or, rather, at two locations on both sides of the center portion arc 31 in the tire width direction. The shoulder side arc 32 protrudes outward in the tire radial direction. Additionally, the shoulder portion arc 33 is located outward of the shoulder side arc 32 in the tire width direction. The shoulder portion arc 33 forms the shoulder 16 and is an arc that protrudes outward in the tire radial direction.

In other words, in the tread surface 11, the shoulder side arc 32 is located on the vehicle outer side in the tire width direction of the center portion arc 31 that is located at the center in the tire width direction, or rather at two locations on both sides of the center portion arc 31; and the shoulder portion arc 33 is located on the vehicle outer side, which is outward of the shoulder side arc 32 in the tire width direction, or rather on both sides of the shoulder side arc 32. Additionally, the center portion arc 31 and the shoulder side arc 32, and the shoulder side arc 32 and the shoulder portion arc 33 are formed so as to be connected and continuous. Sizes differ for each of a curvature radius TR1 of the center portion arc 31, a curvature radius TR2 of the shoulder side arc 32, and a curvature radius TR3 of the shoulder portion arc 33 positioned as described above.

Note that "vehicle outer side in the tire width direction" as used herein refers to an outer side (in the width direction of the vehicle) of the tire with direction of the pneumatic tire 1 in cases where the pneumatic tire 1 is mounted on a vehicle.

A side portion arc 34 is formed outward of the shoulder portion arc 33 in the tire width direction. The side portion arc 34 is located outward of the shoulder portion arc 33 in the tire width direction, is connected to the shoulder portion arc 33, and is formed in a direction from the shoulder portion arc 33 toward the side wall portion 15.

As described above, the side wall portion 15 is provided inward of the tread portion 10 in the tire radial direction, at two locations (both edges) in the tire width direction of the pneumatic tire 1. When viewed as a meridian cross-section, the side wall portion 15 at these two locations both curve so as to protrude outward in the tire width direction.

The tread surface 11 of the pneumatic tire 1 configured as described above is formed as described below. Specifically, a contour range that is a width in the tire width direction from a center portion arc endpoint 35 that is an end of the center portion arc 31 in the tire width direction to the equatorial plane 5 is defined as L1; an external tire diameter of the pneumatic tire 1, or, rather, a diameter of a portion of the tread surface 11 in the tire radial direction having the largest diameter is defined as OD; and a tread developed width that is a width of the tread surface 11 in the tire width direction is defined as TDW. In cases where each constituent of the pneumatic tire 1 is defined such, the tread surface 11 is formed so that K1, as derived from the contour range L1 and the developed tread width TDW in the formula (11) below, satisfies $0.6 \leq K1 \leq 0.9$; and K2, as derived from the curvature radius TR1 of the center portion arc 31 and the external tire diameter OD in the formula (12) below, satisfies $2 < K2$.

$$K1 = L1/(TDW \times 0.5) \quad (11)$$

$$K2 = TR1/OD \quad (12)$$

Figure 2:
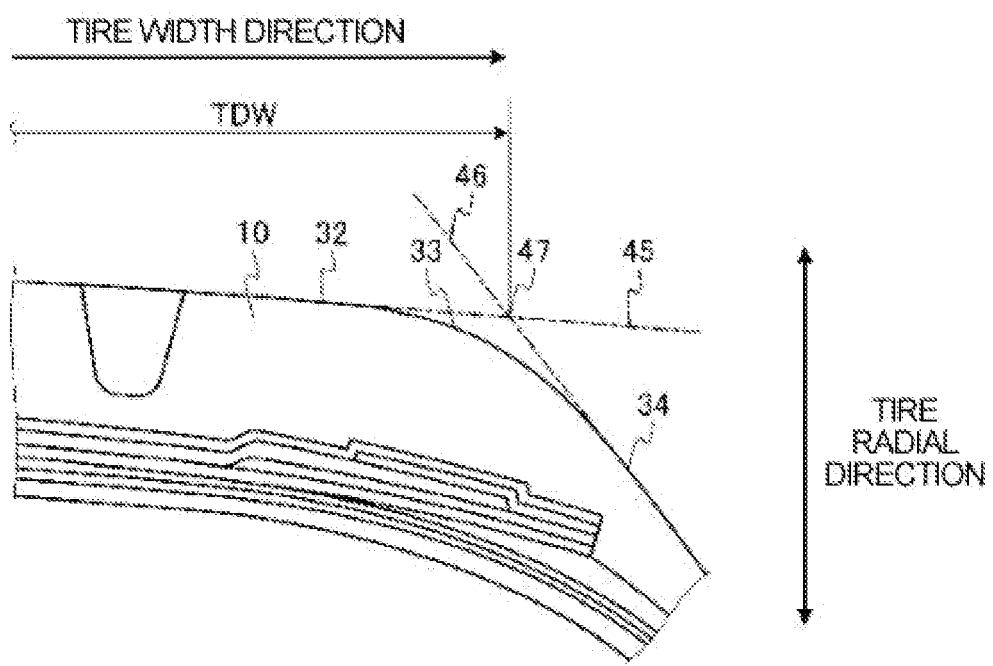
FIG. 2 is a detailed view of portion A of FIG. 1.

FIG. 2 is a detailed view of portion A of FIG. 1. Here, the developed tread width TDW is a distance between virtual tread edges 47 located at both edges of the tread portion 10 in the tire width direction. Specifically, in a meridian cross-section of the pneumatic tire 1, a virtual tread edge 47 is defined as an intersection point between a line extended from the shoulder side arc 45 that is a virtual line extended outward in the tire width direction from a first shoulder side arc 32 of the shoulder side arcs 32 located on both sides in the tire width direction, and a line extended from the side portion arc 46 that is a virtual line extended outward in the tire radial direction from the side portion arc 34 that is connected to the shoulder portion arc 33, which is formed so as to be continuous with the shoulder side arc 32. The virtual tread edge 47 is formed on both edges in the tire width direction, and therefore the distance between the virtual tread edges 47 in the tire width direction is the developed tread width TDW.

When the pneumatic tire 1 is mounted on a vehicle and the vehicle is driven, the pneumatic tire 1 rotates while the tread surface 11 of the tread surface 11 located at the bottom contacts a road surface. When the vehicle is travelling, because the tread surface 11 contacts the road surface as described above, a load acts on the tread surface 11 due to a weight of the vehicle or the like. The load acting on the tread surface 11 varies per tire depending on the travelling condition of the vehicle.

Normally, a difference in the load acting on the tread surface 11 of the front wheels and the rear wheels is generally caused by a difference in masses of a front half of the vehicle and a rear half of the vehicle. Therefore, in a FF-type vehicle for example, compared to the front wheels, the load acting on the tread surface 11 of the rear wheels is greatly reduced. Therefore, even when the vehicle is stopped, because the load acting on the tread surface 11 of the front wheels differs greatly from that acting on the rear wheels, tire contact areas are also greatly different, and thus, the cornering power that is generated is greatly different.

However, the pneumatic tire 1 of the embodiment is designed so that K1, as derived from the contour range L1 and the developed tread width TDW, satisfies $0.6 \leq K1 \leq 0.9$, and K2, as derived from the curvature radius TR1 of the center portion arc 31 and the external tire diameter OD, satisfies $2<K2$. Therefore, with the pneumatic tire 1, the shape of the tread surface 11 can be flattened and the contact area when under light-load conditions can be sufficiently ensured. Thus, when using the pneumatic tire 1 on the rear wheels of a FF-type vehicle, a contact area can be sufficiently ensured under light-load conditions even when the vehicle brakes. Therefore, cornering power when under light-load conditions can be increased. As a result, lateral force variation acting on the vehicle when under light-load conditions can be improved and, therefore, vehicle deviation can be sufficiently suppressed.

Here, K1 is 0.6 or greater but 0.9 or less. By configuring K1 to be 0.6 or greater, a range that the center portion arc 31 having a large curvature radius forms in the tire width direction can be enlarged. Therefore, the shape of the tread surface 11 can be sufficiently flattened. Additionally, by configuring K1 to be 0.9 or less, a forming range of the shoulder side arc 32 in the tire width direction can be ensured. Therefore, the curvature radius from the center portion arc 31 to the shoulder portion arc 33 via the shoulder side arc 32 can be reduced gradually.

Moreover, K2 is configured so as to be greater than 2. By configuring K2 in this manner, the curvature radius TR1 of the center portion arc 31 with respect to the external tire diameter OD can be enlarged appropriately. Therefore, the shape of the tread surface 11 can be sufficiently flattened. Note that a maximum value is not set for K2. This means that a shape of the tread 11, such as where K2 is set to infinity and the center portion arc 31 substantially becomes a straight line that is parallel with the tire width direction, is also included in this embodiment.

As described above, the pneumatic tire 1 of this embodiment is designed so that through a preferable range of K1, as derived from the contour range L1 and the developed tread width TDW, and a preferable range of K2, as derived from the curvature radius TR1 of the center portion arc 31 and the external tire diameter OD, the shape of the tread surface 11 can be sufficiently flattened. Thus, the tire contact area can be sufficiently ensured, and therefore cornering power when under light-load conditions can be increased. As a result, lateral force variation acting on the vehicle when under light-load conditions can be enhanced and, therefore, vehicle deviation can be sufficiently suppressed. Particularly, when braking, the load on the rear wheels lightens because the rear half of FF-type vehicles is light. However, by using the pneumatic tire 1 of this embodiment on the rear wheels, cornering power of the rear wheels when under light-load conditions is increased and the stability of the rear wheels is enhanced. Thus, by using the pneumatic tire 1 of the embodiment on the rear wheels of a FF-type vehicle, vehicle deviation can be suppressed, and this is a benefit of extremely high utility.

Figure 3:
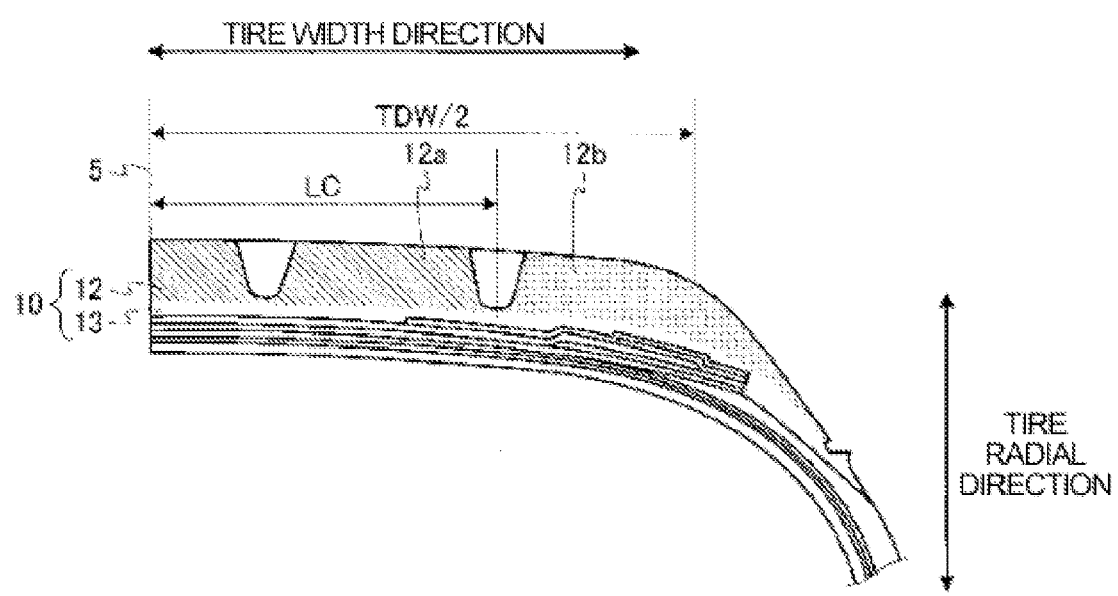
FIG. 3 is a meridian cross-sectional view illustrating main constituents of a pneumatic tire according to the embodiment.

Next, a form in which vehicle deviation can be suppressed to a greater degree using the shape of the tread surface 11 that is configured by the setting of the preferable ranges of K1 and K2 as described above is described. FIG. 3 is a meridian cross-sectional view illustrating main constituents of a pneumatic tire according to the embodiment. As illustrated in the same drawing, in this mode, a tread portion 10 is formed from tread portion rubber including a cap tread 12 and an under tread 13 located inward of the cap tread in the tire radial direction. The cap tread 12 is formed from an inner side cap tread 12a located on an inner side in the tire width direction and an outer side cap tread 12b that is continuous with the inner side cap tread 12a and is located on an outer side in the tire width direction. When a width from the equatorial plane 5 to an end of the inner side cap tread 12a in the tire width direction is defined as LC, KC, as derived from the width LC and the developed tread width TDW in formula (13) below, satisfies $0.9K1 \leq KC \leq 1.1K1$, and also, a JIS A hardness of the inner side cap tread 12a at room temperature is 63 or greater but 75 or less, and also the JIS A hardness of the outer side cap tread 12b at room temperature is 3 or greater but 15 or less lower than the JIS A hardness of the inner side cap tread 12a at room temperature. "Room temperature", as used herein, means 20° C.

$$KC=LC/(TDW \times 0.5) \tag{13}$$

In the embodiment, the hardness of the cap tread 12 is made to vary in the tire width direction. Specifically, while the hardness of the inner side cap tread 12a that is a portion that is close to the tire equatorial plane 5 and that contacts the ground when under light-load conditions is configured so as to be relatively greater, the hardness of the outer side cap tread 12b that is a portion that is close to the tire shoulder end and that contacts the ground when under heavy-load conditions is configured so as to be relatively less. Thus, in this embodiment, by configuring the stiffness of the inner side cap tread 12a that contacts the ground when under light-load conditions so as to be greater than the outer side cap tread 12b, cornering power when under light-load conditions can be more reliably increased, and vehicle deviation when under light-load conditions can be prominently suppressed.

Here, the JIS A hardness of the inner side cap tread 12a at room temperature is preferably configured so as to be 63 or greater but 75 or less. By configuring the hardness so as to be 63 or greater but 75 or less, the stiffness of the inner side cap tread 12a can be sufficiently ensured, and vehicle deviation when under light-load conditions can be greatly suppressed. Additionally, the JIS A hardness of the outer side cap tread 12b at room temperature is preferably configured so as to be 3 or greater but 15 or less lower than the JIS A hardness of the inner side cap tread 12a at room temperature. By configuring the hardness difference so as to be 3 or greater but 15 or less, the stiffness of the portion on the inner side in the tire width direction of the tread portion when under light-load conditions can be sufficiently ensured, and vehicle deviation when under light-load conditions can be prominently suppressed. On the other hand, the hardness difference will be great if it exceeds 15, and will be a cause of uneven wear.

Furthermore, when using a cap tread 12 having a predetermined hardness distribution determined by these constituents 12a and 12b, a range of KC can be configured so as to satisfy $0.9K1 \leq KC \leq 1.1K1$. The relationship $0.9K1 \leq KC$ is possible because, by configuring the stiffness of the outer side cap tread 12b, which is prone to separation from the road surface when the tire is under light-load conditions, so as to be less than the stiffness of the inner side cap tread 12a, cornering power can be sufficiently generated even if the range formed in the tire width direction by the center portion arc 31 that has a large curvature radius is configured so as to be somewhat more to the inner side in the tire width direction than a boundary between the arc 31 and the arc 32. The relationship KC≤1.1K1 is possible because, by configuring the stiffness of the outer side cap tread 12b so as to be less than the stiffness of the inner side cap tread 12a, cornering power can be sufficiently generated even if the range formed in the tire width direction by the center portion arc 31 that has a large curvature radius is configured so as to be somewhat more to the outer side in the tire width direction than a boundary between the arc 31 and the arc 32, or even if the curvature radius from the arc 31 to the arc 33 is changed somewhat abruptly.

Figure 4:
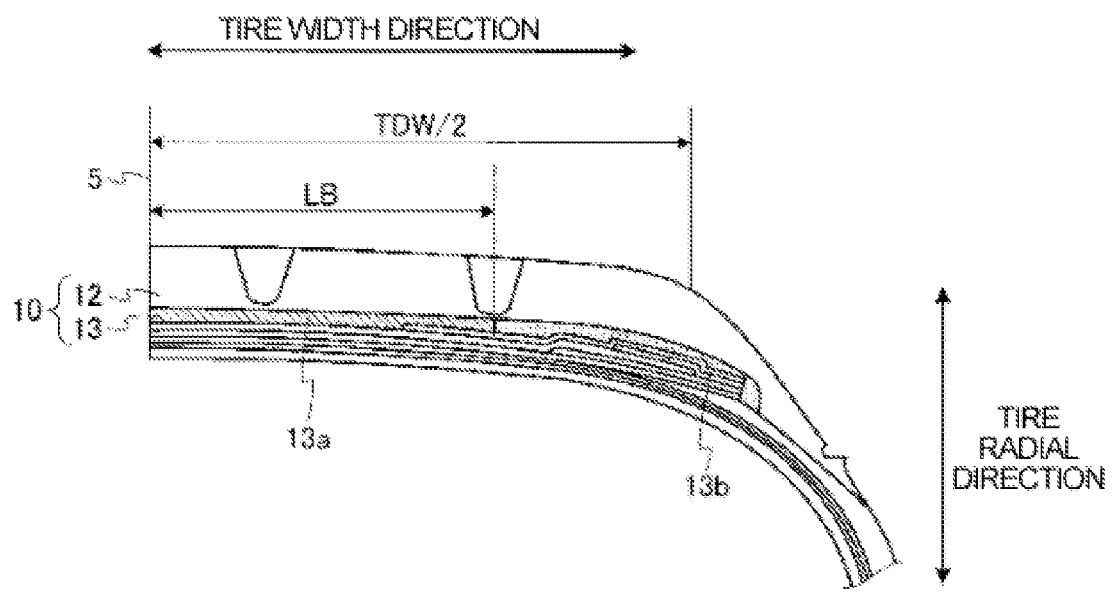
FIG. 4 is a meridian cross-sectional view illustrating main constituents of a pneumatic tire according to the embodiment.

Next, another form in which vehicle deviation can be suppressed to a greater degree using the shape of the tread surface 11 that is configured by the setting of the preferable ranges of K1 and K2 as described above is described. FIG. 4 is a meridian cross-sectional view illustrating main constituents of a pneumatic tire according to the embodiment. As illustrated in the same drawing, in this mode, a tread portion 10 is formed from tread portion rubber including a cap tread 12 and an under tread 13 located inward of the cap tread 12 in the tire radial direction. The under tread 13 is formed from an inner side under tread 13a located on an inner side in the tire width direction and an outer side under tread 13b that is continuous with the inner side under tread 13a and is located on an outer side in the tire width direction. When a width from the equatorial plane 5 to an end of the inner side under tread 13a in the tire width direction is defined as LB, KB, as derived from the width LB and the developed tread width TDW in formula (14) below, satisfies 0.9K1≤KB≤1.1K1. Also, a JIS A hardness of the inner side under tread 13a at room temperature is 55 or greater but 65 or less, and a JIS A hardness of the outer side under tread 13b at room temperature is 3 or greater but 15 or less lower than the JIS A hardness of the inner side under tread 13a at room temperature. "Room temperature", as used herein, means 20° C.

$$KB = LB/(TDW \times 0.5) \qquad (14)$$

In this embodiment, the hardness of the under tread 13 is made to vary in the tire width direction. Specifically, the hardness of the inner side under tread 13a that is a portion that is close to the tire equatorial plane 5 and that contacts the ground when under light-load conditions is configured so as to be greater than the hardness of the outer side under tread 13b that is a portion that is close to the tire shoulder end and that contacts the ground when under heavy-load conditions. Thus, in this embodiment, by configuring the stiffness of a portion on the inner side in the tire width direction of the tread portion 10 that contacts the ground when under light-load conditions so as to be greater than a portion on the outer side in the tire width direction of the tread portion 10, cornering power when under light-load conditions can be more reliably increased, and vehicle deviation when under light-load conditions can be prominently suppressed.

Here, the JIS A hardness of the inner side under tread 13a at room temperature is preferably configured so as to be 55 or greater but 65 or less. By configuring the hardness so as to be 55 or greater but 65 or less, the stiffness of the portion on the inner side in the tire width direction of the tread portion 10 can be sufficiently ensured, and vehicle deviation when under light-load conditions can be prominently suppressed. On the other hand, if the hardness exceeds 65, durability under the tread grooves will decrease. Additionally, the JIS A hardness of the outer side under tread 13b at room temperature is preferably configured so as to be 3 or greater but 15 or less lower than the JIS A hardness of the inner side under tread 13a at room temperature. By configuring a hardness difference of the hardnesses to be 3 or greater but 15 or less, the contact area of the outer side cap tread 12b that is located outward of the outer side under tread 13 in roughly the tire radial direction can be sufficiently ensured when under light-load conditions. On the other hand, the hardness difference will be great if it exceeds 15, and will be a cause of uneven wear.

Furthermore, when using an under tread 13 having a predetermined hardness distribution determined by these constituents 13a and 13b, a range of KB can be configured so as to satisfy 0.9K1≤KB≤1.1K1. The relationship 0.9K1≤KB is possible because, by configuring the stiffness of the outer side under tread 13b, which is prone to separation from the road surface when the tire is under light-load conditions and is located under the outer side cap tread 12b in roughly the tire radial direction, so as to be less than the stiffness of the inner side under tread 13a, which is located under the inner side cap tread 12a in roughly the tire radial direction, cornering power can be sufficiently generated, even if the range formed in the tire width direction by the inner side under tread 13a that is located under the inner side cap tread 12a in roughly the tire radial direction that constitutes the center portion arc 31 that has a large curvature radius is configured so as to be somewhat more to the inner side in the tire width direction than the boundary between the arc 31 and the arc 32. On the other hand, the relationship KB≤1.1K1 is possible because by configuring the stiffness of the outer side under tread 13b so as to be less than the stiffness of the inner side under tread 13a, cornering power can be sufficiently generated, even if the range formed in the tire width direction by the inner side under tread 13a that is located under the inner side cap tread 12a in roughly the tire radial direction, which constitutes the center portion arc 31 that has a large curvature radius, is configured so as to be somewhat more to the outer side in the tire width direction than the boundary of the arc 31 and the arc 32; and even if the profile of the cap tread 12 located on the outer side of the under treads 13a and 13b in the tire radial direction changes somewhat abruptly from the arc 31 to the arc 33.

As described above, KC and KB can be designed so that each has a width that is ±10% of K1. In other words, the width LC and the width LB illustrated in FIGS. 3 and 4 can be designed so as to have widths that are ±10% thereof, and thus somewhat different, of the contour range L1 illustrated in FIG. 1. Additionally, regarding the design of KC and KB, KC and KB may be used alone or in combination. Furthermore, KC and KB can be configured so as to be the same value. In this case, because the width LC and the width LB are the same length, interfaces between the inner sides 12a and 13a and the outer sides 12b and 13b of the cap tread 12 and the under tread 13 are congruent. In contrast, KC and KB can be configured so as to be different values. In this case, because the width LC and the width LB are different lengths, interfaces between the inner sides 12a and 13a and the outer sides 12b and 13b of the cap tread 12 and the under tread 13 are not congruent.

A case in which the pneumatic tire 1 is used on the rear wheels of a FF-type vehicle has been described, but the present embodiment is not limited to such cases. Specifically, the pneumatic tire 1 is also applicable for use on the rear wheels of a front-engine/rear-drive (FR-type) vehicle. In a FR-type vehicle, a load on the front wheels is greatly reduced when driving. However, if the center of gravity of the vehicle does not line up with the center of the vehicle, there is a possibility that a moment will be generated in the vehicle and vehicle deviation will occur. In such cases, by using the pneumatic tire 1 of the present embodiment on the front wheels of a FR-type vehicle, cornering power of the front wheels when under light-load conditions can be increased and the stability of the front wheels can be enhanced. Thus, by using the pneumatic tire 1 of this embodiment on the front wheels of a FR-type vehicle as well, vehicle deviation can be suppressed and this is a benefit of extremely high utility.

EXAMPLES

Pneumatic tires according to the embodiment, conventional example, and comparative example were manufactured and evaluated. Note that the pneumatic tires according to embodiment are working examples. The comparative example is not the same as the conventional example.

Pneumatic tires for each of Working Examples 1 to 21, Conventional Example 1, and Comparative Example 1 were manufactured in the following manner: each had a common tire size of 175/65R15. A pneumatic tire having the configuration illustrated in FIG. 1 was used. K1 as derived from L1 and TDW illustrated in FIG. 1, K2 as derived from TR1 and OD illustrated in FIG. 1, and TDW/2, LC, and LB of FIGS. 3 and 4 were varied as shown in Table 1. Additionally, the stiffness of the inner side cap tread 12a and the outer side cap tread 12b illustrated in FIG. 3, and the stiffness of the inner side under tread 13a and the outer side under tread 13b illustrated in FIG. 4 were also varied as shown in Table 1.

Each of these test tires was mounted on a rim having a rim size of 15×5.0. Air pressure was adjusted to 230 kPa, and lateral deviation when braking was evaluated according to the following measurement conditions. A 1300 cc displacement class FF-type vehicle was used. In order to evaluate lateral deviation when braking, an amount of vehicle deviation experienced when braking, until stopping, while travelling straight on a dry road test course at a speed of 100 km/h was measured. Regarding the amount of vehicle deviation, cases in which deviation over one or more lanes occurred was evaluated as dangerous and cases in which deviation over one or more lanes did not occur was evaluated as safe. The amount of vehicle deviation of the pneumatic tires of Working Examples 1 to 21, Conventional Example 1, and Comparative Example 1 was indexed, and the values thereof were recorded in Table 1. Larger index values of the amount of vehicle deviation indicate superior results. Examples scoring over 80 were considered to be passing (safe).

As is clear from Table 1, all of the pneumatic tires of Working Examples 1 to 21 that are within the scope of the present technology obtained superior results (exceeding 80) with regards to vehicle deviation. In contrast, both of the pneumatic tires of Conventional Example 1 and Comparative Example 1, which are not within the scope of the present technology, did not obtain a score that exceeded 80 with regards to vehicle deviation. The results of Working Examples 1 to 21 are described in further detail below.

With Working Examples 1 and 2, the values of K1 and K2 are within the scope of the present technology. In Working Examples 1 and 2, a maximum or minimum of the optimal range of K1 (0.6 to 0.9) is used. Therefore, in both examples, a superior score for vehicle deviation that exceeded 80 was obtained. With Working Examples 3 to 5, in contrast with Working Example 1, the range of KC was varied within the preferable range ($0.9K1 \leq KC \leq 1.1K1$) and the inner side and outer side cap treads 12a and 12b were provided with a preferable hardness difference (the tread 12b was set so as to be from 3 to 15 lower). Therefore, in each of Working Examples 3 to 5, a score for vehicle deviation higher than that of Working Example 1 was obtained. With Working Examples 6 and 7, in contrast with Working Example 1, the range of KC was varied outside of the preferable range, but the inner side and outer side cap treads 12a and 12b were provided with a preferable hardness difference (the tread 12b was set so as to be from 3 to 15 lower). Therefore, in each of Working Examples 6 and 7, a score for vehicle deviation higher than that of Working Example 1 was obtained. With Working Examples 8, in contrast with Working Example 1, the inner side and outer side cap treads 12a and 12b were provided with a preferable hardness difference (the tread 12b was set so as to be from 3 to 15 lower). Therefore, in Working Example 8, a score for vehicle deviation higher than that of Working Example 1 was obtained. With Working Examples 9 and 10, in contrast with Working Example 1, the inner side and outer side cap treads 12a and 12b were not provided with a preferable hardness difference (where the tread 12b is set so

TABLE 1

| | Entire Profile, etc. | | Profile of the Cap Tread, etc. | | | Profile of the Under Tread, etc. | | | Evaluated Item |
|---|---|---|---|---|---|---|---|---|---|
| | K1 | K2 | KC | Inner side hardness | Outer side hardness | KB | Inner side hardness | Outer side hardness | Vehicle deviation |
| Working Example 1 | 0.6 | 2.1 | 0.6 | 65 | 65 | 0.6 | 60 | 60 | 82 |
| Working Example 2 | 0.9 | ∞ | 0.9 | 65 | 65 | 0.9 | 60 | 60 | 85 |
| Working Example 3 | 0.6 | 2.1 | 0.54 | 70 | 64 | 0.6 | 60 | 60 | 85 |
| Working Example 4 | 0.6 | 2.1 | 0.6 | 70 | 64 | 0.6 | 60 | 60 | 88 |
| Working Example 5 | 0.6 | 2.1 | 0.66 | 70 | 64 | 0.6 | 60 | 60 | 85 |
| Working Example 6 | 0.6 | 2.1 | 0.53 | 70 | 64 | 0.6 | 60 | 60 | 83 |
| Working Example 7 | 0.6 | 2.1 | 0.67 | 70 | 64 | 0.6 | 60 | 60 | 83 |
| Working Example 8 | 0.6 | 2.1 | 0.6 | 76 | 64 | 0.6 | 60 | 60 | 84 |
| Working Example 9 | 0.6 | 2.1 | 0.6 | 60 | 64 | 0.6 | 60 | 60 | 81 |
| Working Example 10 | 0.6 | 2.1 | 0.6 | 63 | 47 | 0.6 | 60 | 60 | 81 |
| Working Example 11 | 0.6 | 2.1 | 0.6 | 65 | 65 | 0.54 | 60 | 54 | 84 |
| Working Example 12 | 0.6 | 2.1 | 0.6 | 65 | 65 | 0.6 | 60 | 54 | 87 |
| Working Example 13 | 0.6 | 2.1 | 0.6 | 65 | 65 | 0.66 | 60 | 54 | 84 |
| Working Example 14 | 0.6 | 2.1 | 0.6 | 70 | 64 | 0.53 | 60 | 54 | 81 |
| Working Example 15 | 0.6 | 2.1 | 0.6 | 70 | 64 | 0.67 | 60 | 54 | 81 |
| Working Example 16 | 0.6 | 2.1 | 0.6 | 70 | 64 | 0.6 | 66 | 54 | 83 |
| Working Example 17 | 0.6 | 2.1 | 0.6 | 70 | 64 | 0.6 | 56 | 60 | 83 |
| Working Example 18 | 0.6 | 2.1 | 0.6 | 70 | 64 | 0.6 | 55 | 39 | 83 |
| Working Example 19 | 0.6 | 2.1 | 0.6 | 70 | 64 | 0.54 | 60 | 54 | 98 |
| Working Example 20 | 0.6 | 2.1 | 0.6 | 70 | 64 | 0.6 | 60 | 54 | 100 |
| Working Example 21 | 0.6 | 2.1 | 0.6 | 70 | 64 | 0.66 | 60 | 54 | 98 |
| Conventional Example 1 | 0.5 | 1 | 0.5 | 65 | 65 | 0.5 | 60 | 60 | 70 |
| Comparative Example 1 | 0.5 | 2 | 0.5 | 65 | 65 | 0.5 | 60 | 60 | 70 | as to be from 3 to 15 lower), but both Working Examples 9 and 10, obtained a score for vehicle deviation higher than that of Working Example 1.

With Working Examples 11 to 13, in contrast with Working Example 1, the range of KB was varied within the preferable range (0.9K1≤KB≤1.1K1) and the inner side and outer side under treads 13a and 13b were provided with a preferable hardness difference (the tread 13b was set so as to be from 3 to 15 lower). Therefore, in each of Working Examples 11 to 13, a score for vehicle deviation higher than that of Working Example 1 was obtained.

With Working Examples 14 to 18, in contrast with Working Example 1, the inner side and outer side cap treads 12a and 12b were provided with a preferable hardness difference (the tread 12b was set so as to be from 3 to 15 lower). Of these, with Working Examples 14 and 15, the inner side and outer side under treads 13a and 13b were provided with a preferable hardness difference (the tread 13b was set so as to be from 3 to 15 lower), but the range of KB was varied outside of the preferable range. Therefore, in both of Working Examples 14 and 15, a score for vehicle deviation lower than that of Working Example 1 was obtained. Additionally, with Working Example 16, the inner side and outer side under treads 13a and 13b were provided with a preferable hardness difference (the tread 13b was set so as to be from 3 to 15 lower). Therefore, in Working Example 16, a score for vehicle deviation higher than that of Working Example 1 was obtained. Furthermore, with Working Examples 17 and 18, the inner side and outer side under treads 13a and 13b were not provided with a preferable hardness difference (where the tread 13b is set so as to be from 3 to 15 lower), but both Working Examples 17 and 18, obtained a score for vehicle deviation higher than that of Working Example 1.

With Working Examples 19 to 21, in contrast with Working Example 1, the inner side and outer side cap treads 12a and 12b were provided with a preferable hardness difference (the tread 12b was set so as to be from 3 to 15 lower), the range of KB was varied within a preferable range (0.9K1≤KB≤1.1K1), and the inner side and outer side under treads 13a and 13b were provided with a preferable hardness difference (the tread 13b was set so as to be from 3 to 15 lower). Therefore, for each of the Working Examples 19 to 21, a score for vehicle deviation much greater than that of Working Example 1 was obtained.

INDUSTRIAL APPLICABILITY

As described above, the pneumatic tire of the present technology is useful for sufficiently generating cornering power when under light-load conditions and suppressing vehicle deviation.

What is claimed is:

1. A pneumatic tire comprising a tread surface which, when viewed as a meridian cross-section, is formed having a profile with a plurality of differing curvature radii, wherein:
in a state where the pneumatic tire is assembled on a regular rim and is inflated to an inner pressure that is 5% of a regular inner pressure, when a curvature radius of a center portion arc located on a centermost side in a tire width direction of the tread surface is defined as TR1, a contour range that is a width from an equatorial plane to an end of the center portion arc in the tire width direction is defined as L1, a tread developed width that is a width of the tread surface in the tire width direction is defined as TDW, and an external tire diameter that is a diameter of a portion of the tread surface in a tire radial direction having a largest diameter is defined as OD, K1, as derived from the contour range L1 and the developed tread width TDW in formula (1) below, satisfies 0.6<K1<0.9, K2, as derived from the curvature radius TR1 of the center portion arc and the external tire diameter OD in formula (2) below, satisfies 2.0<K2:

$$K1=L1/(TDW \times 0.5) \quad (1)$$

$$K2=TR1/OD \quad (2),$$

a tread portion is formed from tread portion rubber comprising a cap tread forming the tread surface and an under tread located inward of the cap tread in the tire radial direction; wherein the cap tread is formed from an inner side cap tread located on an inner side in the tire width direction and an outer side cap tread that is continuous with the inner side cap tread and is located on an outer side in the tire width direction;

when a width from the equatorial plane to an end of the inner side cap tread in the tire width direction is defined as LC, KC, as derived from the width LC and the developed tread width TDW in formula (3) below, satisfies 0.9K1≤KC≤1.1K1; and a JIS A hardness of the inner side cap tread at room temperature is 63 or greater but 75 or less, and a JIS A hardness of the outer side cap tread at room temperature is 3 or greater but 15 or less lower than the JIS A hardness of the inner side cap tread at room temperature:

$$KC=LC/(TDW \times 0.5) \quad (3).$$

2. The pneumatic tire according to claim 1, wherein the tread portion is formed from tread portion rubber comprising a cap tread forming the tread surface and an under tread located inward of the cap tread in the tire radial direction; wherein the under tread is formed from an inner side under tread located on an inner side in the tire width direction and an outer side under tread that is continuous with the inner side under tread and is located on an outer side in the tire width direction;

when a width from the equatorial plane to an end of the inner side under tread in the tire width direction is defined as LB, KB, as derived from the width LB and the developed tread width TDW in formula (4) below, satisfies 0.9K1≤KB≤1.1K1; and a JIS A hardness of the inner side under tread at room temperature is 55 or greater but 65 or less, and a JIS A hardness of the outer side under tread at room temperature is 3 or greater but 15 or less lower than the JIS A hardness of the inner side under tread at room temperature:

$$KB=LB/(TDW \times 0.5) \quad (4).$$

3. The pneumatic tire according to claim 2, wherein KC and KB comprise a same value.

4. The pneumatic tire according to claim 2, wherein KC and KB comprise different values.

5. The pneumatic tire according to claim 1, wherein when a width from the equatorial plane to an end of the inner side cap tread in the tire width direction is defined as LC, KC, as derived from the width LC and the developed tread width TDW in formula (13) below, satisfies 0.9K1≤KC≤1.1K1:

$$KC=LC/(TDW \times 0.5) \quad (13)$$

6. The pneumatic tire according to claim 5, wherein a JIS A hardness of the inner side cap tread at room temperature is 63 or greater but 75 or less.

7. The pneumatic tire according to claim 6, wherein a JIS A hardness of the outer side cap tread at room temperature is 3 or greater but 15 or less lower than the JIS A hardness of the inner side cap tread at room temperature.

8. A pneumatic tire comprising a tread surface which, when viewed as a meridian cross-section, is formed having a profile with a plurality of differing curvature radii, wherein:
in a state where the pneumatic tire is assembled on a regular rim and is inflated to an inner pressure that is 5% of a regular inner pressure, when a curvature radius of a center portion arc located on a centermost side in a tire width direction of the tread surface is defined as TR1, a contour range that is a width from an equatorial plane to an end of the center portion arc in the tire width direction is defined as L1, a tread developed width that is a width of the tread surface in the tire width direction is defined as TDW, and an external tire diameter that is a diameter of a portion of the tread surface in a tire radial direction having a largest diameter is defined as OD,
K1, as derived from the contour range L1 and the developed tread width TDW in formula (1) below, satisfies $0.6 < K1 \leq 0.9$,
K2, as derived from the curvature radius TR1 of the center portion arc and the external tire diameter OD in formula (2) below, satisfies $2.0 < K2$:

$$K1 = L1/(TDW \times 0.5) \quad (1)$$

$$K2 = TR1/OD \quad (2),$$

the tread portion is formed from tread portion rubber comprising a cap tread forming the tread surface and an under tread located inward of the cap tread in the tire radial direction; wherein the under tread is formed from an inner side under tread located on an inner side in the tire width direction and an outer side under tread that is continuous with the inner side under tread and is located on an outer side in the tire width direction;
when a width from the equatorial plane to an end of the inner side under tread in the tire width direction is defined as LB, KB, as derived from the width LB and the developed tread width TDW in formula (4) below, satisfies $0.9K1 \leq KB \leq 1.1K1$; and
a JIS A hardness of the inner side under tread at room temperature is 55 or greater but 65 or less, and a JIS A hardness of the outer side under tread at room temperature is 3 or greater but 15 or less lower than the JIS A hardness of the inner side under tread at room temperature:

$$KB = LB/(TDW \times 0.5) \quad (4).$$

9. The pneumatic tire according to claim 8, wherein interfaces between the inner sides and the outer sides of the cap tread and the under tread are congruent.

10. The pneumatic tire according to claim 8, wherein interfaces between the inner sides and the outer sides of the cap tread and the under tread are not congruent.

11. The pneumatic tire according to claim 8, wherein the tread surface is formed so that K1, as derived from the contour range L1 and the developed tread width TDW in formula (11) below, satisfies $0.6 \leq K1 \leq 0.9$:

$$K1 = L1/(TDW \times 0.5) \quad (11).$$

12. The pneumatic tire according to claim 11, wherein K2, as derived from the curvature radius TR1 of the center portion arc and the external tire diameter OD in formula (12) below, satisfies $2 < K2$:

$$K2 = TR1/OD \quad (12).$$

13. The pneumatic tire according to claim 3, wherein when a width from the equatorial plane to an end of the inner side under tread in the tire width direction is defined as LB, KB, as derived from the width LB and the developed tread width TDW in formula (14) below, satisfies $0.9K1 \leq KB \leq 1.1K1$:

$$KB = LB/(TDW \times 0.5) \quad (14).$$

14. The pneumatic tire according to claim 13, wherein a JIS A hardness of the inner side under tread at room temperature is 55 or greater but 65 or less.

15. The pneumatic tire according to claim 14, wherein a JIS A hardness of the outer side under tread at room temperature is 3 or greater but 15 or less lower than the JIS A hardness of the inner side under tread at room temperature.

16. A pneumatic tire comprising a tread surface which, when viewed as a meridian cross-section, is formed having a profile with a plurality of differing curvature radii, wherein:
in a state where the pneumatic tire is assembled on a regular rim and is inflated to an inner pressure that is 5% of a regular inner pressure, when a curvature radius of a center portion arc located on a centermost side in a tire width direction of the tread surface is defined as TR1, a contour range that is a width from an equatorial plane to an end of the center portion arc in the tire width direction is defined as L1, a tread developed width that is a width of the tread surface in the tire width direction is defined as TDW, and an external tire diameter that is a diameter of a portion of the tread surface in a tire radial direction having a largest diameter is defined as OD,
K1, as derived from the contour range L1 and the developed tread width TDW in formula (1) below, satisfies $0.6 < K1 < 0.9$,
K2, as derived from the curvature radius TR1 of the center portion arc and the external tire diameter OD in formula (2) below, satisfies $2.0 < K2$:

$$K1 = L1/(TDW \times 0.5) \quad (1)$$

$$K2 = TR1/OD \quad (2), \text{ and}$$

a tread portion is formed from tread portion rubber comprising a cap tread forming the tread surface and an under tread located inward of the cap tread in the tire radial direction; and wherein the cap tread is formed from an inner side cap tread located on an inner side in the tire width direction and an outer side cap tread that is continuous with the inner side cap tread and is located on an outer side in the tire width direction.

17. The pneumatic tire according to claim 16, wherein when a width from the equatorial plane to an end of the inner side cap tread in the tire width direction is defined as LC, KC, as derived from the width LC and the developed tread width TDW in formula (3) below, satisfies $0.9K1 \leq KC \leq 1.1K1$:

$$KC = LC/(TDW \times 0.5) \quad (3).$$

18. The pneumatic tire according to claim 17, wherein a JIS A hardness of the inner side cap tread at room temperature is 63 or greater but 75 or less.

* * * * *